No. 641,517. Patented Jan. 16, 1900.
C. E. KEEL.
AUTOMATIC COMPUTING MACHINE.
(Application filed Sept. 23, 1899.)

(No Model.) 2 Sheets—Sheet 1.

WITNESSES:

INVENTOR:
Charles E. Keel,
BY
ATTORNEY.

THE NORRIS PETERS CO., PHOTO-LITHO., WASHINGTON, D. C.

No. 641,517. Patented Jan. 16, 1900.
C. E. KEEL.
AUTOMATIC COMPUTING MACHINE.
(Application filed Sept. 23, 1899.)

(No Model.) 2 Sheets—Sheet 2.

WITNESSES:
Wm H Payne
Wm E Thompson

INVENTOR:
Charles E. Keel,
BY E. G. Silvius,
ATTORNEY.

UNITED STATES PATENT OFFICE.

CHARLES E. KEEL, OF INDIANAPOLIS, INDIANA.

AUTOMATIC COMPUTING-MACHINE.

SPECIFICATION forming part of Letters Patent No. 641,517, dated January 16, 1900.

Application filed September 23, 1899. Serial No. 731,382. (No model.)

*To all whom it may concern:*

Be it known that I, CHARLES E. KEEL, a citizen of the United States, residing at Indianapolis, in the county of Marion and State of Indiana, have invented certain new and useful Improvements in Automatic Computing-Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to that class of machines or apparatus which operate automatically in computing and determining mathematical results deduced from numbers given, and has reference more particularly to a machine whereby the amount of taxes may be computed and indicated at certain rates upon given amounts of valuation.

The invention consists in a manually-operated machine consisting of a pair of main rotating disks, one of which contains numbers representing valuations or base-figures and the other of which contains numbers representing results or amounts of taxes or percentage, a pair of rotating numbered disks to show the higher denominations or order of figures in connection with those on the main disks, intermediate gearing whereby the disks are caused to rotate in the proper ratios of speed to effect the desired results, and a frame whereby the several parts are supported.

The invention consists, further, in the parts and combination and arrangement of parts hereinafter described and claimed.

The objects of this invention are to provide means whereby tax-rolls may be made rapidly and accurately, eliminating the trouble caused by errors in calculations, dispensing with considerable clerical expense, and obviating the necessity of employing experts in making written and mental calculations. These objects are fully attained in my invention, which may be cheaply produced and is durable and economical in use and with slight modification in its adaptation may be employed for making computations of various kinds.

Figure 1:
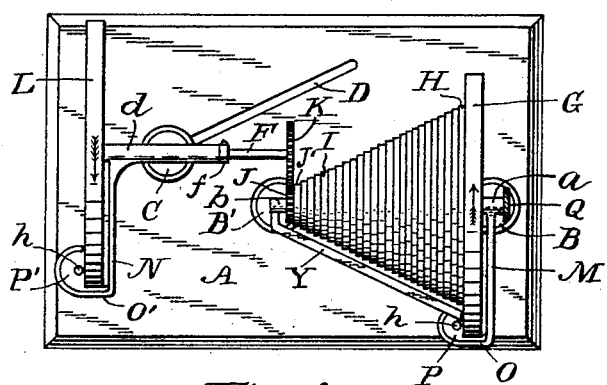
Figure 3:
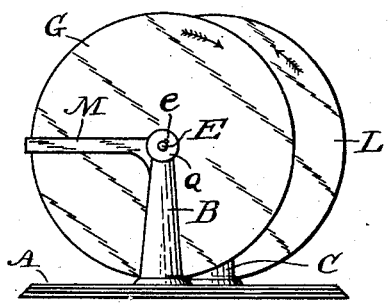
Figure 2:
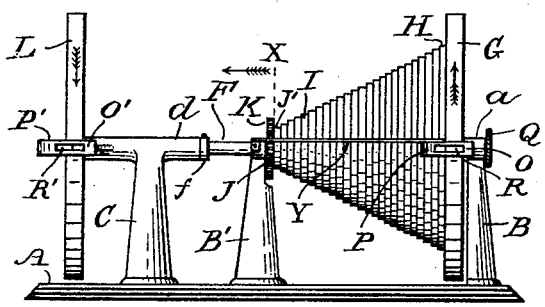
Figure 4:
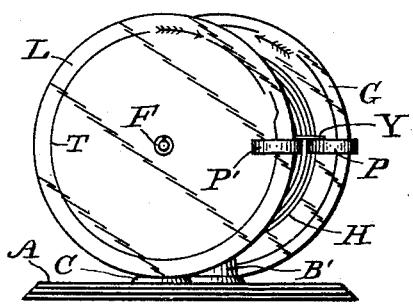
Figure 5:
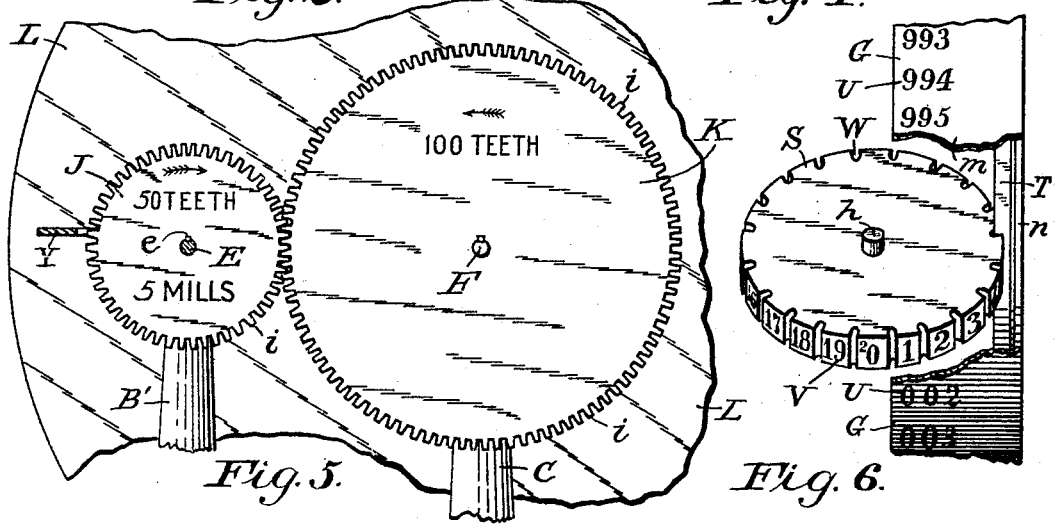
Figure 6:
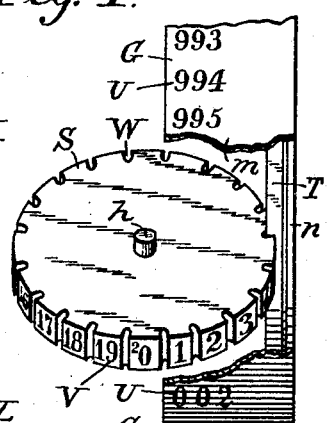
Figure 7:
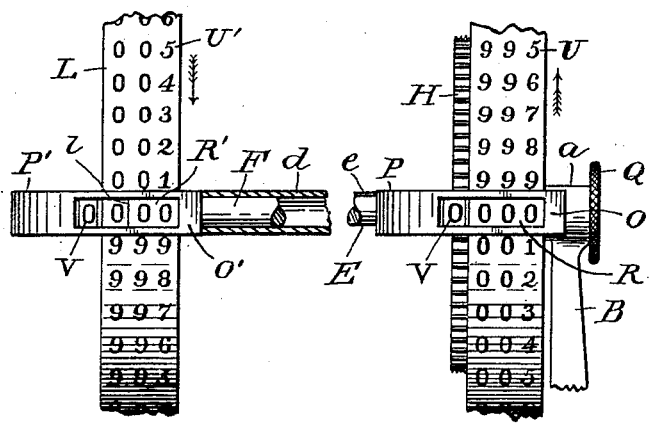
Figure 8:
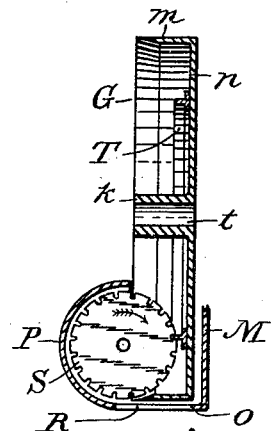
Figure 10:
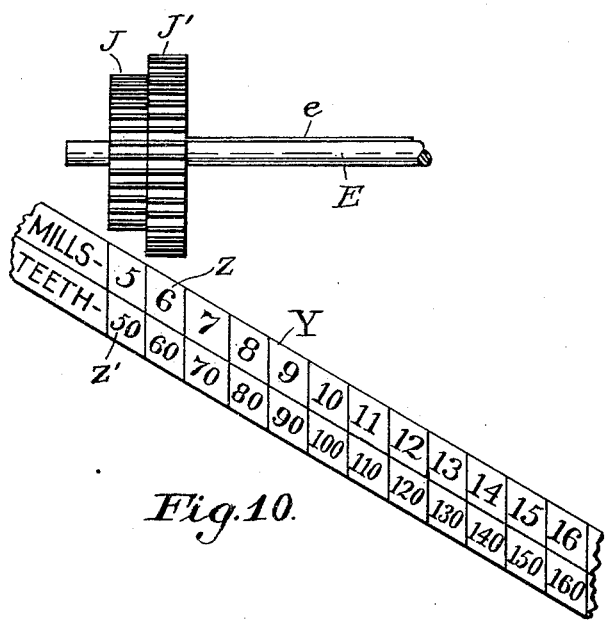
Figure 9:
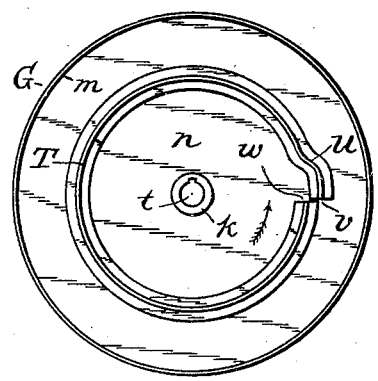

Referring to the drawings, Figure 1 represents a top plan view of a machine constructed in accordance with my invention; Fig. 2, a front elevation; Figs. 3 and 4, elevations of opposite ends; Fig. 5, a fragmentary transverse view taken on a line X in Fig. 2; Fig. 6, a fragmentary detail view showing perspectively a secondary disk carrying the numerals representing the higher denominations; Fig. 7, a fragmentary detail view showing the manner of arranging the numbers upon the main disks; Fig. 8, a horizontal central sectional view of one of the main disks; Fig. 9, an elevation of one of the main disks, showing the interior; and Fig. 10, a fragmentary plan view of the indicator.

Similar letters of reference in the several figures of the drawings indicate similar parts.

In construction I provide a suitable base A, adapted to be placed upon a table or desk when in use, but supporting-legs may be applied thereto. Upon the base I construct a frame of suitable design, a most simple and light one consisting of rigidly-attached posts B and B' and a movable post C, which latter is adjustable relatively to the others. The post B has at its top a horizontal journal-bearing $a$, and the post B' has a like bearing $b$ in alinement with the other bearing, and in these is mounted a revoluble shaft E. The lower end of the post C is fitted into a slot D in the base A, arranged obliquely to the shaft E, or a binding-bolt may work in the slot and enter the base of the post, such construction being familiar; or, instead of the slot, any other equivalent, as a rib or a flange, may be employed to produce the same result. The top of the post has a long horizontal journal-bearing $d$ situate in a line parallel to the shaft E and in which is mounted a revoluble shaft F, having a collar $f$ or similar device to prevent longitudinal motion of the shaft.

The two main disks G and L each have a hub $k$ and bore $t$, a web $n$, and rim $m$, and they are preferably of equal dimensions. The disk G is secured to the shaft E near the outer end, and a hand-wheel Q is secured to the outer end of the shaft E as a means for rotating it; but in some cases I may substitute equally simple means for propulsion, as a crank and gear-wheels. The disk L is secured to the outer end of the shaft F, and to the inner end of this shaft is secured a gear-wheel K of suitable diameter, whereby the shaft and the disk L may be actuated rotatively.

A suitable number of gear-wheels, as H I J', having different diameters, are secured to the shaft E, as by a spline e, to transmit motion and a proper degree of speed to the disk L relatively to the speed of the disk G. These gear-wheels may be of any suitable type; but I preferably employ the well-known type of toothed wheel, in the present case the wheel K being provided with one hundred teeth and the smallest wheel J on the shaft E having fifty teeth. In Figs. 1 and 2 in the representations of wheels the teeth are not shown on all the wheels on account of limitation of space. The next wheel J' contains sixty teeth, and each wheel therefrom is of increased diameter and having ten more teeth, so that the sixth wheel would have one hundred teeth and the twenty-sixth wheel H would have three hundred teeth. These proportions may, however, be varied as the requirements may demand, as there may be a difference of but five teeth when the rate is fractional. In the present case the connection of the wheel K with the wheel J would adapt the machine to compute and indicate at a rate of five mills per one-dollar valuation, with wheel J' for six mills, with wheel I for ten mills, and with wheel H for thirty-mills rate, an example of the proportions being shown in the fragment of the indicator Y in Fig. 10, which may obviously be extended in scope to any desired extent. The indicator is preferably mounted across the faces of the toothed wheels to insure accuracy; but a similar one may be arranged at the edge of the slot D in the base. The numerals Z indicate the rate, and Z' indicate the number of teeth on each wheel.

The disk G is provided on the exterior surface of its rim m with numerals U, beginning with the unit "1" and continuing upward in value consecutively to include any number, according to the range of the machine desired; but I preferably embrace nine hundred and ninety-nine, (999,) followed by three ciphers with which to represent one thousand. They are spaced equidistantly, so as to occupy the whole circumference. The disk L is likewise provided with exactly the same numerals, as U', but arranged in reverse order, as the disks rotate in reversed directions, as indicated by the arrows, as a matter of convenience; but an "idler" gear-wheel may be employed, so that both disks rotate in the same direction, in which case the numerals would be arranged identically. All units are prefixed by two ciphers and all tens by one cipher.

In order to indicate the fourth or thousand numeral, I provide a secondary disk S, which may be arranged to operate either vertically or horizontally, the latter being preferable, as shown, where it is provided with a vertical axle $h$, suitably mounted in a case P or P', connected with a gage O or O', provided with a view-aperture R or R', in which it may be desirable to affix a magnifying-glass to more readily read the figures on the disks, which may in some cases be necessarily extremely small. The gages and connected cases are suitably supported, as by arms M and N, attached to the frame-posts. The disk S has numerals V on its periphery, divided into equal spaces by notches W, which are engaged by a scroll T, attached to the web $n$ of the main disk. The scroll has an offset $u$, near which its continuity is broken, the terminals $v$ and $w$ being spread sufficiently to engage two notches, so that the disk is rotated at the proper time to add one thousand to the sum. In the disk L the offset is in a reversed direction. In some cases the rotations of the disk S may be caused by means of a similar scroll placed at the interior of the rim $m$.

In practical use the operator may sit before the machine and cause the disks to be rotated, first observing the disk G and bringing the desired base-figure within range of the observation-aperture R, then reading the result of the calculation, which automatically appears at the aperture R'. In the drawings the machine is shown as set for computing at the rate of five mills per one dollar, and it will readily be understood that by releasing the post C the same may be transferred so as to connect the wheel K with either one of the other wheels on the shaft E. In every case when setting the machine for a rate the disks must be set so as to register zero identically at the gages, Fig. 7 illustrating this.

To further explain the mode of operation, suppose it is desired to ascertain the amount of tax to assess upon the valuation of seven thousand three hundred and ten dollars at the rate of twenty mills on the dollar. The wheel K is set to mesh with a wheel on shaft E, which would be shown on the indicator to have two hundred teeth, while the disks at the gages would show zero. Then rotate disk G until "7310" shows at the aperture R, then at the aperture R' read "14620," the wheel $k$, and consequently the disk L, having traveled twice the distance rotatively as the driver. In the result the two numerals at the right are always considered as cents or fractions of one hundred, so that the amount as above should be read as one hundred and forty-six dollars and twenty cents. On the disk L there may be a line dividing the integer column from the fractional column, or a score $l$ may be made on the glass in the aperture R'. Suppose the base-figure is two thousand five hundred. Turn the disk G backward until this number is indicated at the gage. The disk L would turn backward and indicate "5000" or fifty dollars. In each case the disks S perform their part in supplying the thousands place. Suppose the wheel K is engaging the wheel J, as shown, being for a five-mill rate, and the base-number is one thousand dollars. Turn disk G to indicate this at the gage O, this being one revolution thereof. The wheel J being only one-half as large diametrically as wheel K causes the disk L to make one-half of a revolution. Hence its reading would be "500" or five dollars.

While I show a convenient form, it is obvious that some of the parts of the machine may be transposed within the scope of my invention. Any suitable number of gear-wheels may be placed on the shaft E, and any suitable number of teeth may be given to the wheels per inch of periphery, the essential being a known ratio in proportions of the wheels on the shafts E and F.

Having thus described my invention, what I claim, and desire to secure by Letters Patent, is—

1. A computing-machine comprising a pair of counterpart disks one of which is secured to a rotating shaft permanently mounted and the other of which is secured to a rotating shaft mounted adjustably both laterally and longitudinally, identical numerals arranged at the peripheries of the disks, and toothed wheels secured to the shafts and meshing with each other.

2. A computing-machine comprising a horizontal permanently-mounted rotating shaft, a disk secured to the permanently-mounted shaft and having numerals arranged at the periphery thereof, an adjustably-mounted rotating shaft situate in a line parallel to the permanently-mounted shaft, a disk secured to the adjustably-mounted shaft and having numerals arranged at the periphery thereof, a toothed wheel secured to the adjustably-mounted shaft, and a toothed wheel secured to the permanently-mounted shaft and engaging the toothed wheel on the adjustably-mounted shaft.

3. A computing-machine consisting of a main rotating disk having a peripheral rim and a series of numbers ranging from a unit upward arranged on the outer face of the rim, a secondary disk having numbers arranged on the periphery thereof and operated by the main disk, a second main rotating disk suitably mounted on a movable frame and having a peripheral rim and a series of numbers ranging from a unit upward arranged on the outer face of the rim, a secondary disk having numbers arranged on the periphery thereof and operated by the second main disk, and a gage having a sight-aperture permanently mounted at the face of each of the main disks so as to designate the reading of each main and secondary disk together.

4. A computing-machine comprising a frame, a pair of horizontal stationary journal-bearings in alinement, a rotating shaft in the bearings and having an operating-wheel, a horizontal movable journal-bearing situate in a line parallel to the line of the stationary bearings, a rotating shaft in the movable bearing, a pair of counterpart main disks provided each with numerals at the periphery thereof and secured one to each of the rotating shafts, secondary disks mounted on vertical shafts at the peripheries of the main disks and controlled thereby, sight-gages mounted at the peripheries of the disks, and gear-wheels connecting the two rotating shafts.

5. A computing-machine comprising a frame, a pair of rotating shafts one of which is mounted in fixed bearings and the other of which is mounted in movable bearings and provided each with a main disk secured thereto and having at the periphery thereof a rim and a scroll or cam, identical numerals arranged upon the rims of both disks, secondary disks engaged by the scrolls and having numerals arranged at their peripheries, toothed wheels secured to the rotating shafts and engaging one with another, and sight-gages permanently supported at the peripheries of the main and secondary disks, whereby the readings of the main and secondary disks together may be determined.

6. In a computing-machine, the combination of a base, a frame, a rotating shaft mounted in permanent bearings, a main disk secured to the rotating shaft and having a series of numbers arranged on the periphery thereof, a secondary disk operated by such main disk, means for actuating the rotating shaft, a series of toothed wheels secured to such rotating shaft, a rotating shaft mounted in movable bearings in a line parallel to said first-described rotating shaft and having a toothed wheel secured thereto and engaging one of said series of toothed wheels, a second main disk secured to said second-described rotating shaft and having a series of numbers arranged on the periphery thereof, a secondary disk operated by such second main disk, and a sight-gage supported at the periphery of each of said main disks.

7. In a computing-machine, the combination of the base; the permanent frame; the movable frame; the rotating shaft journaled in the permanent frame; a main disk and a series of toothed wheels secured to the rotating shaft; a rotating shaft journaled in the movable frame; a second main disk and a toothed wheel secured to the second-described rotating shaft and operated by the first-described rotating shaft; numerals arranged at the periphery of each of the main disks and identical in both disks so as to designate any value from a unit to one thousand, the latter represented by three "ciphers;" a secondary disk mounted at the left-hand side of each of the main disks and having each numerals whereby values from "one thousand" upward are added to the values of the numerals upon the main disks; and sight-gages whereby to indicate the reading of each main and secondary disk together.

8. In a computing-machine, the combination with the series of toothed wheels secured to a shaft, of the indicator mounted in front of such wheels and designating the diameter and ratio of each of such wheels.

9. In a computing-machine, the combination of the base, the permanent frame, the movable frame, the rotating shaft mounted on each of said frames, the pair of counterpart numbered disks one of which is secured to one and the other of which is secured to the other of said shafts and moving in parallel vertical planes, the series of toothed wheels secured to one of the rotating shafts, the toothed wheel secured to the other one of said rotating shafts and meshing with one of said series of toothed wheels, the secondary disks, the sight-gages, and the indicator for the series of toothed wheels.

10. In a computing-machine, the combination of the base, the permanent frame, the movable frame, the rotating shafts mounted on said frames, the pair of counterpart numbered main disks secured one to each of the rotating shafts, the series of toothed wheels secured to one of the rotating shafts, the toothed wheel secured to the other one of the rotating shafts and meshing with one of said series of toothed wheels, the secondary disks mounted at the periphery of the main disks and operated thereby, and the sight-gages mounted permanently whereby to indicate the simultaneous reading of each of the main and secondary disks together.

In testimony whereof I affix my signature in presence of two witnesses.

CHARLES E. KEEL.

Witnesses:
WM. C. THOMPSON,
E. T. SILVIUS.